(12) United States Patent
Shidai et al.

(10) Patent No.: US 11,694,489 B2
(45) Date of Patent: Jul. 4, 2023

(54) MESSAGE MONITORING SYSTEM, MESSAGE TRANSMISSION ELECTRONIC CONTROL UNIT, AND MONITORING ELECTRONIC CONTROL UNIT

(71) Applicant: DENSO CORPORATION, Kariya (JP)

(72) Inventors: Takahiro Shidai, Kariya (JP); Masumi Egawa, Kariya (JP); Keita Hayakawa, Kariya (JP); Toru Hasegawa, Kariya (JP); Naoya Ishida, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 16/827,772

(22) Filed: Mar. 24, 2020

(65) Prior Publication Data
US 2020/0312060 A1    Oct. 1, 2020

(30) Foreign Application Priority Data

Mar. 29, 2019    (JP) ................. 2019-065350

(51) Int. Cl.
| | | |
|---|---|---|
| H04L 12/24 | (2006.01) | |
| H04L 41/0803 | (2022.01) | |
| G07C 5/08 | (2006.01) | |
| H04L 67/12 | (2022.01) | |
| H04L 12/40 | (2006.01) | |
| H04L 12/66 | (2006.01) | |
| H04L 43/08 | (2022.01) | |

(52) U.S. Cl.
CPC ............. *G07C 5/0808* (2013.01); *G07C 5/08* (2013.01); *H04L 12/40013* (2013.01);
(Continued)

(58) Field of Classification Search
CPC ......... G07C 5/0808; G07C 5/08; H04L 67/12; H04L 12/40013; H04L 12/66;
(Continued)

(56) References Cited

U.S. PATENT DOCUMENTS

| | | | |
|---|---|---|---|
| 10,298,612 B2* | 5/2019 | Galula ................. | H04L 67/12 |
| 2008/0186870 A1* | 8/2008 | Butts ................. | H04L 43/0847 |
| | | | 370/252 |

(Continued)

FOREIGN PATENT DOCUMENTS

| | | |
|---|---|---|
| JP | 2018-026663 A | 2/2018 |
| JP | 2019-140577 A | 8/2019 |
| WO | WO-2013-094072 A1 | 6/2013 |

*Primary Examiner* — Moustafa M Meky
*Assistant Examiner* — Elizabeth Kassa
(74) *Attorney, Agent, or Firm* — Harness, Dickey & Pierce, P.L.C.

(57) ABSTRACT

A message monitoring system includes a first electronic control unit and a second electronic control unit connected to the first electronic control unit via a communication network. In the first electronic control unit, a first message is generated; a first feature value representing a feature of the first message is calculated; a second message storing the first feature value is generated; and the first message is transmitted whereas the second message is transmitted periodically. In the second electronic control unit, the first message and the second message are received from the first electronic control unit; a second feature value representing a feature of the received first message is calculated; and a comparison is performed between (i) the first feature value stored in the received second message and (ii) the calculated second feature value; and whether the first message is normal is determined based on a result of the comparison.

17 Claims, 7 Drawing Sheets

(52) U.S. Cl.
CPC .............. *H04L 12/66* (2013.01); *H04L 43/08* (2013.01); *H04L 67/12* (2013.01)

(58) Field of Classification Search
CPC ................. H04L 43/08; H04L 63/1416; H04L 2012/40273; H04L 43/0823; H04W 12/121; H04W 4/48
USPC .......................................................... 701/32
See application file for complete search history.

(56) References Cited

U.S. PATENT DOCUMENTS

| | | | |
|---|---|---|---|
| 2013/0013127 A1* | 1/2013 | Weinberg | H04L 12/417 |
| | | | 701/1 |
| 2014/0328352 A1* | 11/2014 | Mabuchi | H04L 12/4035 |
| | | | 370/451 |
| 2016/0261561 A1* | 9/2016 | Kim | H04L 67/12 |
| 2016/0381066 A1* | 12/2016 | Galula | H04L 63/1441 |
| | | | 726/23 |
| 2016/0381068 A1* | 12/2016 | Galula | G07C 5/0816 |
| | | | 726/23 |
| 2018/0048663 A1* | 2/2018 | Yura | H04L 12/40 |
| 2018/0109622 A1* | 4/2018 | Galula | H04W 84/005 |
| 2019/0141070 A1* | 5/2019 | Tsurumi | B60R 1/00 |
| 2019/0347402 A1* | 11/2019 | Hamada | B60R 16/0231 |
| 2020/0312060 A1* | 10/2020 | Shidai | G07C 5/08 |
| 2020/0389469 A1* | 12/2020 | Litichever | H04L 63/029 |

\* cited by examiner

▼ : 1ST MESSAGE
▽ : 2ND MESSAGE

FIG. 5B

| 2ND MESSAGE | 1ST FEATURE VALUE |
|---|---|
| M21 | 0 |
| M22 | 1 |
| M23 | 1 |
| M24 | 3 |

| 2ND MESSAGE | 1ST FEATURE VALUE |
|---|---|
| M21 | 0 |
| M22 | 1 |
| M23 | 3 |
| M24 | 4 |

FIG. 9

▼ : 1ST MESSAGE
▽ : 2ND MESSAGE
✎ : FRAUDULENT MESSAGE

FIG. 10

MESSAGE MONITORING SYSTEM, MESSAGE TRANSMISSION ELECTRONIC CONTROL UNIT, AND MONITORING ELECTRONIC CONTROL UNIT

CROSS REFERENCE TO RELATED APPLICATION

The present application is based on Japanese Patent Application No. 2019-65350 filed on Mar. 29, 2019, the disclosure of which is incorporated herein by reference.

TECHNICAL FIELD

The present disclosure relates to a message monitoring system for monitoring a message transmitted and received between electronic control units, and electronic control units used in the system, and particularly to a message monitoring system for a vehicle.

BACKGROUND

Various types of electronic control units have been mounted on a vehicle. Those electronic control units are connected to each other via a communication network such as a CAN (Controller Area Network) to configure an in-vehicle system. Such an in-vehicle system is known to use a network intrusion detection system (NIDS: Network-based Intrusion Detection System) to detect suspicious accesses or data from an outside.

SUMMARY

According to an example of the present disclosure, a message monitoring system for a vehicle may be provided to include a first electronic control unit and a second electronic control unit connected to the first electronic control unit via a communication network. In the first electronic control unit, a first message may be generated; a first feature value representing a feature of the first message may be calculated; a second message storing the first feature value may be generated; and the first message may be transmitted whereas the second message is transmitted periodically. In the second electronic control unit, the first message and the second message may be received from the first electronic control unit; a second feature value representing a feature of the received first message may be calculated; and a comparison may be performed between (i) the first feature value stored in the received second message and (ii) the calculated second feature value; and whether the first message is normal may be determined based on a result of the comparison.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Embodiments of the present disclosure will be described below with reference to the drawings. When there are a plurality of embodiments, the configuration disclosed in each embodiment is not closed only in each embodiment, but can be combined across the embodiments. For example, the configuration disclosed in one embodiment may be combined with another embodiment. Further, the disclosed configurations in the respective embodiments may be collected and combined.

First Embodiment

Figure 1:
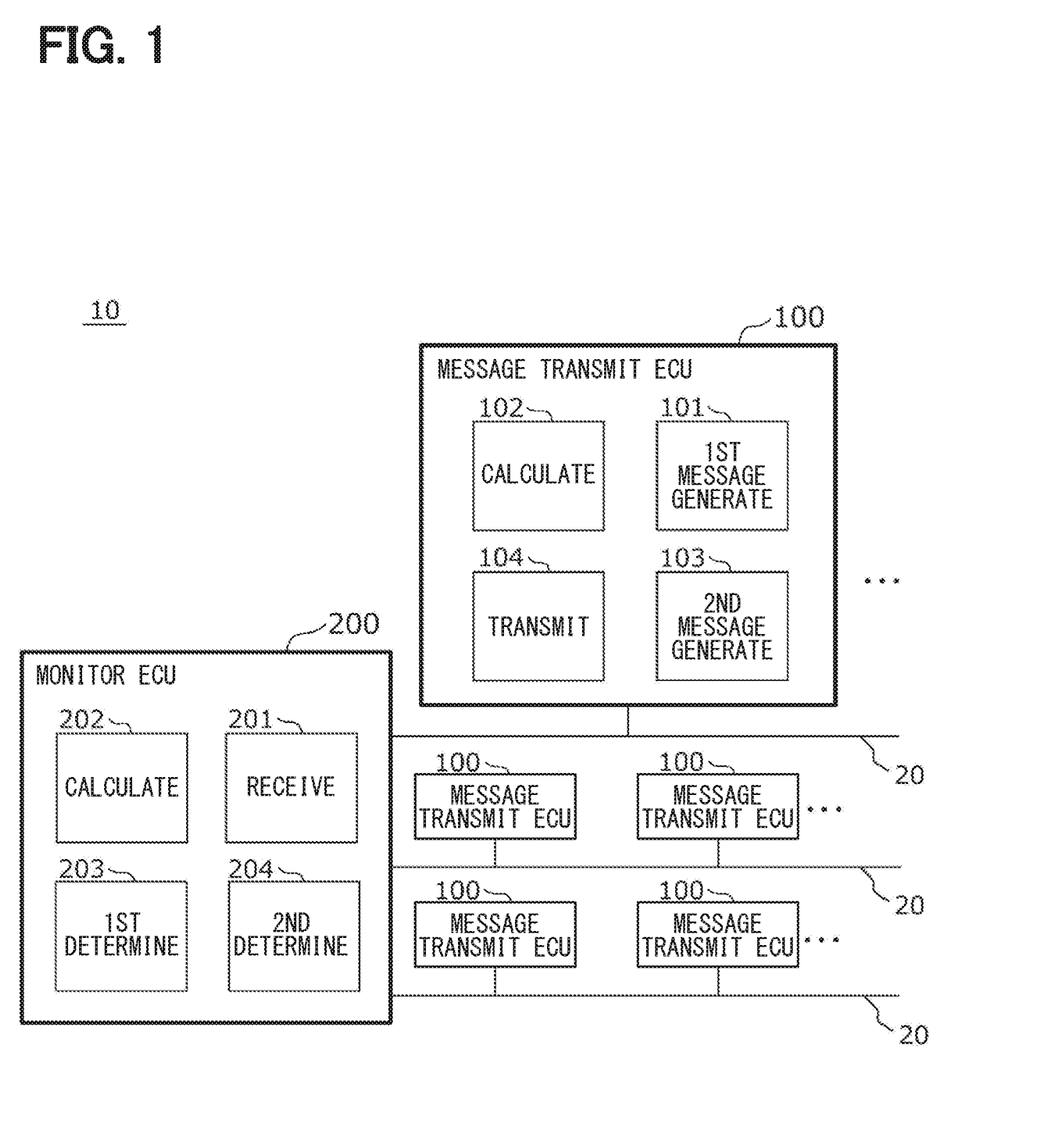
FIG. 1 is a diagram illustrating a message monitoring system according to a first embodiment of the present disclosure.

FIG. 1 shows a message monitoring system 10 for a vehicle. The message monitoring system 10 includes (i) a plurality of electronic control units 100 and (ii) an electronic control unit 200 that is a gateway device connected to the plurality of electronic control units 100 via a communication network including a plurality of buses 20. In the embodiments described below, the electronic control unit 100 that transmits a message monitored by the electronic control unit 200 to the electronic control unit 200 may also be referred to as a message transmission electronic control unit (ECU) or a first electronic control unit (ECU). The electronic control unit 200 that monitors a message transmitted from the message transmission ECU 100 may also be referred to as a monitoring electronic control unit (ECU) or a second electronic control unit (ECU).

In the present embodiment, both the message transmission ECU 100 and the monitoring ECU 200 are described as examples of in-vehicle ECUs in the vehicle message monitoring system 10 mounted on the vehicle. However, the message monitoring system 10 of the present embodiment is not limited to such an in-vehicle system. For example, another configuration may be provided where the message transmission ECU 100 is mounted on a vehicle, whereas the monitoring ECU 200 is disposed outside the vehicle to monitor the message transmission ECU 100 from outside the vehicle.

The message monitoring system 10 for a vehicle shown in FIG. 1 is assumed to use a CAN (Controller Area Network) bus 20 as a communication network for connecting the message transmission ECU 100 and the monitoring ECU 200 to each other. However, the communication network 20 may use any communication method such as LIN (Local Interconnect Network), Ethernet (registered trademark), Wi-Fi (registered trademark), Bluetooth (registered trademark), and the like.

The message transmission ECU 100 and the monitoring ECU 200 will be described below.

1. Message Transmission ECU 100

(1) Configuration

As shown in FIG. 1, the message transmission ECU 100 includes a first message generation unit 101 (which may also be referred to as a first message generator 101), a calculation unit 102 (which may also be referred to as a calculator 102), a second message generation unit 103 (which may also be referred to as a second message generator 103), and a transmission unit 104 (which may also be referred to as a transmitter 104). The message transmission ECU 100 is an ECU whose transmission message is monitored in respect of normality or abnormality (i.e., correctness or incorrectness) by the monitoring ECU 200 described later.

The first message generation unit 101 generates a first message when a predetermined event has occurred. The predetermined event is, for example, execution of a specific operation (e.g., an operation of a brake, operation of a shift lever, or the like) on the vehicle, or an occurrence of a specific state of the vehicle (e.g., a vehicle speed or the number of engine revolutions exceeding a preset threshold).

The calculation unit 102 (corresponding to a first calculation unit or a first calculator) obtains or calculates a feature value representing a feature of the first message generated by the first message generation unit 101. Hereinafter, the feature value obtained or calculated by the calculation unit 102 is referred to as a first feature value. Here, the "feature" of the present disclosure means not only the content of the data stored in the message but also the external features or data communication parameters of the message (e.g., message length, message transmission interval, message transmission count).

For example, the calculation unit 102 obtains a feature value representing the feature of the first message based on the number of (transmission) times the transmission unit 104 described below has transmitted the first message. The embodiment described below explains an example in which the calculation unit 102 obtains or calculates the number of times the first message has been transmitted as a first feature value. As another example, the calculation unit 102 may obtain, as the first feature value, a value obtained by subtracting the number of times the transmission unit 104 has transmitted the first message from a preset numerical value. The "number of times" the message has been transmitted is the number of transmission times, which starts to be counted from a predetermined point of time. For example, it may be a total number of times since the message monitoring system was activated, or the number of times from a predetermined clock time or a predetermined point of time. Further, the number of times may also be referred to as a count.

In another example, the calculation unit 102 obtains the first feature by performing a logical operation on the value stored in the first message generated by the first message generation unit 101 using a predetermined logical operation expression (for example, a logical sum or a logical product). Suppose an example case where a value represented by 8 bits is stored in the first message. Such an example case calculates a first feature value by performing a logical operation on the value of each bit by a predetermined logical operation expression.

In still another example, the calculation unit 102 may encrypt the value stored in the first message, or calculates a hash value of the value stored in the first message as the first feature value.

Suppose a case where the first message generation unit 101 generates a plurality of first messages. In such a case, the calculation unit 102 desirably obtains the first feature value using the plurality of first messages. For example, suppose a case where the first message generation unit 101 generates two first messages M11 and M12. In such a case, a first value is obtained by performing a logical operation on the value stored in the first message M11 and a second value is obtained by performing a logical operation on the value stored in the first message M12; then, a first feature value is obtained by performing a predetermined logical operation on the first value and the second value.

The second message generation unit 108 generates a second message that stores the first feature value obtained by the calculation unit 102. In the embodiment described below, the second message is a message, which stores only the first feature value obtained by the calculation unit 102, and is generated for the monitoring ECU 200 to determine whether the message is normal. However, the second message may be any message that is periodically (i.e., regularly) transmitted to monitoring ECU 200. For example, suppose a case where a predetermined message storing a data indicating the behavior of the vehicle is periodically transmitted from the message transmission ECU 100 to the monitoring ECU 200. In such a case, a second message may be prepared as the predetermined message that further stores the first feature value in addition to the data.

Figure 2:
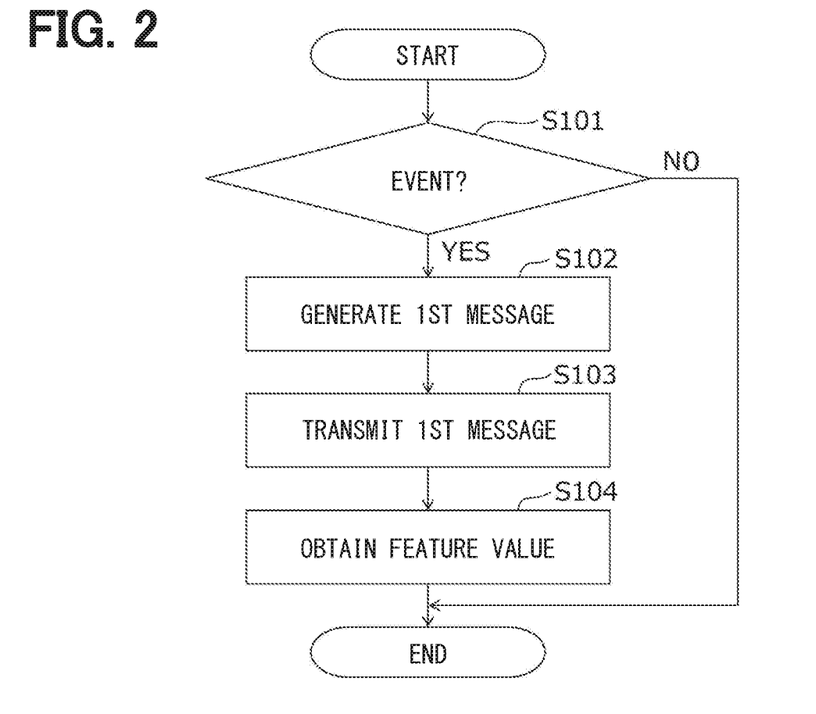
FIG. 2 is a diagram illustrating an operation of a message transmission ECU according to the first embodiment.
Figure 3:
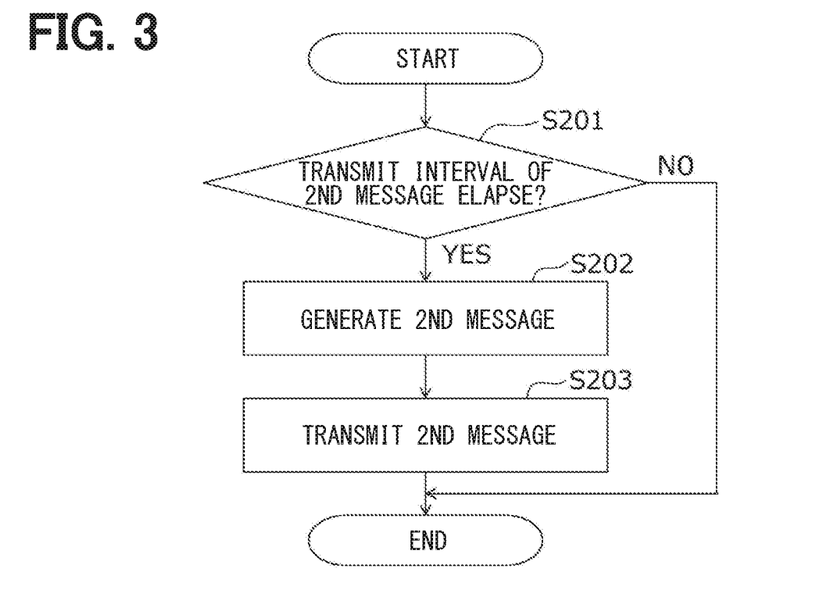
FIG. 3 is a diagram illustrating an operation of the message transmission ECU according to the first embodiment.

The transmission unit 104 transmits (i) the first message generated by the first message generation unit 101 and (ii) the second message generated by the second message generation unit 103, to the monitoring ECU 200. Here, since the first message is a message generated when a predetermined event occurs, the transmission unit 104 transmits the first message every time an event occurs, that is, irregularly. On the other hand, the transmission unit 104 periodically (i.e., regularly) transmits the second message, (2) Operation FIGS. 2 and 3 are diagrams illustrating the operation of the message transmission ECU. FIG. 2 shows the operation of the message transmission ECU 100 when transmitting the first message; FIG. 3 shows the operation of the message transmission ECU 100 when transmitting the second message.

In FIG. 2, the first message generation unit 101 determines whether an event has occurred (S101). If an event has occurred (S101: Yes), a first message is generated (S102), and the first message is transmitted from the transmission unit 104 (S103). Then, the calculation unit 102 obtains a first feature value representing the feature of the first message generated in S102 (S104).

In FIG. 3, the second message generation unit 103 determines whether the transmission interval of the second message has elapsed (S201). If it is determined that the transmission interval has elapsed (S201: Yes), a second message storing the first feature value obtained in S104 of FIG. 2 is generated (S202). The second message is transmitted by the transmission unit 104 (S203). In FIG. 3, after determining whether the transmission interval has elapsed in S201, the second message is generated in S202. However, another configuration may be adopted in which the second message is generated in advance, and when it is determined that the transmission interval has elapsed, the second message generated in advance may be transmitted from the transmission unit 104. For example, the second message generation unit 103 generates a new second message storing the first feature value every time the first feature value is obtained in S104 of FIG. 2. As a result, the second message always stores the latest feature value.

2. Monitoring ECU 200

(1) Configuration

As shown in FIG. 1, the monitoring ECU 200 includes a reception unit 201 (which may also be referred to as a receiver 201), a calculation unit 202 (which may also be referred to as a calculator 202), a first determination unit 203 (which may also be referred to as a first determiner 203), and a second determination unit 204 (which may also be referred to as a second determiner 204). The monitoring ECU 200 is an ECU that monitors whether the message transmitted from message transmission ECU 100 is normal.

The reception unit 201 receives the first message and the second message transmitted from message transmission ECU 100.

The calculation unit 202 (corresponding to a second calculation unit or a second calculator) obtains or calculates a feature value representing a feature of the first message received by the reception unit 201. Hereinafter, the feature value obtained by the calculation unit 202 is referred to as a second feature value. The method by which the calculation unit 202 obtains the second feature value needs to correspond to the method by which the calculation unit 102 of the message transmission ECU 100 obtains the first feature value. In the embodiment described below, an example will be described in which the calculation unit 202 calculates the "number of times" the reception unit 201 has received the first message as the second feature value. However, the calculation unit 202 may obtain the second feature value by another method according to the method by which the calculation unit 102 obtains the first feature value. For example, the calculation unit 202 may obtain, as the second feature value, a value obtained by subtracting the number of times the reception unit 201 has received the first message from a preset numerical value. Alternatively, the second feature value may be obtained by performing a logical operation on the value stored in the first message received by the reception unit 201 using a predetermined logical operation expression, or by encrypting the value stored in the first message received by the reception unit 201 or calculating a hash value of the value stored in the first message received by the reception unit 201.

The first determination unit 203 determines whether the received second message is normal based on the number of (reception) times per unit time the reception unit 201 has received the second message or the reception interval at which the reception unit 201 has received the second message. Since the second message is a message periodically transmitted by the message transmission ECU 100, the reception unit 201 should periodically receive the second message. Therefore, the number of receptions (i.e., reception times) per unit time or the message reception interval is used to determine whether the reception unit 201 periodically receives the second message. This can determine whether a plurality of second messages include an abnormal message, or whether a specific second message is a normal message.

For example, suppose a case where the elapsed time from when the reception unit 201 receives the immediately preceding second message to when the reception unit 201 receives the latest second message is equal to a predetermined transmission interval of the second message transmitted periodically from the message transmission ECU, In such a case, the second message received by the reception unit 201 is determined to be normal. In contrast, suppose a case where the elapsed time from when the reception unit 201 receives the immediately preceding second message to when the reception unit 201 receives the latest second message is different from the predetermined transmission interval of the second message transmitted periodically from the message transmission ECU. In such a case, the second message received by the reception unit 201 is likely to be a message transmitted fraudulently. Therefore, the first determination unit 203 determines that the second message received by the reception unit 201 is not normal.

Alternatively, the first determination unit 203 may determine whether the message is normal by determining whether the number of times the second message has been received within a predetermined period of time is equal to the expected number of receptions (i.e., reception times) calculated based on the predetermined period of time and the transmission interval. In this case, the first determination unit 203 determines that any one of the plurality of second messages received within a predetermined period of time is not normal.

The second determination unit 204 performs a "comparison" between (i) the first feature value stored in the second message received by the reception unit 201 and (ii) the second feature value obtained by the calculation unit 202, and determines whether the first message is normal based on the comparison result. Here, the above "comparison" may refer to an operation using the first feature value and the second feature value, including the sum, difference, product, and quotient of the first feature value and the second feature value, to thereby evaluate the relationship between the first feature value and the second feature value.

For example, suppose a case where the first feature value is the number of times that the transmission unit 104 in the message transmission ECU 100 has transmitted the first message, and the second feature value is that the reception unit 201 of the monitoring ECU 200 has received the first message. In such a case, two numbers of times should be equal. Therefore, when these values are determined to be equal based on a result of comparing the first feature value and the second feature value, the second determination unit 204 determines that the first message received by the reception unit 201 is normal. On the other hand, suppose a case where an unauthorized or fraudulent first message is transmitted by unauthorized access (i.e., fraudulent access) from an outside. In such a case, the second feature value (i.e., the number of (reception) times the reception unit 201 in the monitoring ECU 200 has received the first message) is greater than the first feature value (i.e., the number of (transmission) times the transmission unit 104 in the message transmission ECU 100 has transmitted the first message). Therefore, when the first feature value and the second feature value are not equal, the second determination unit 204 determines that the first message received by the reception unit 201 is not normal.

(2) Operation

Figure 4:
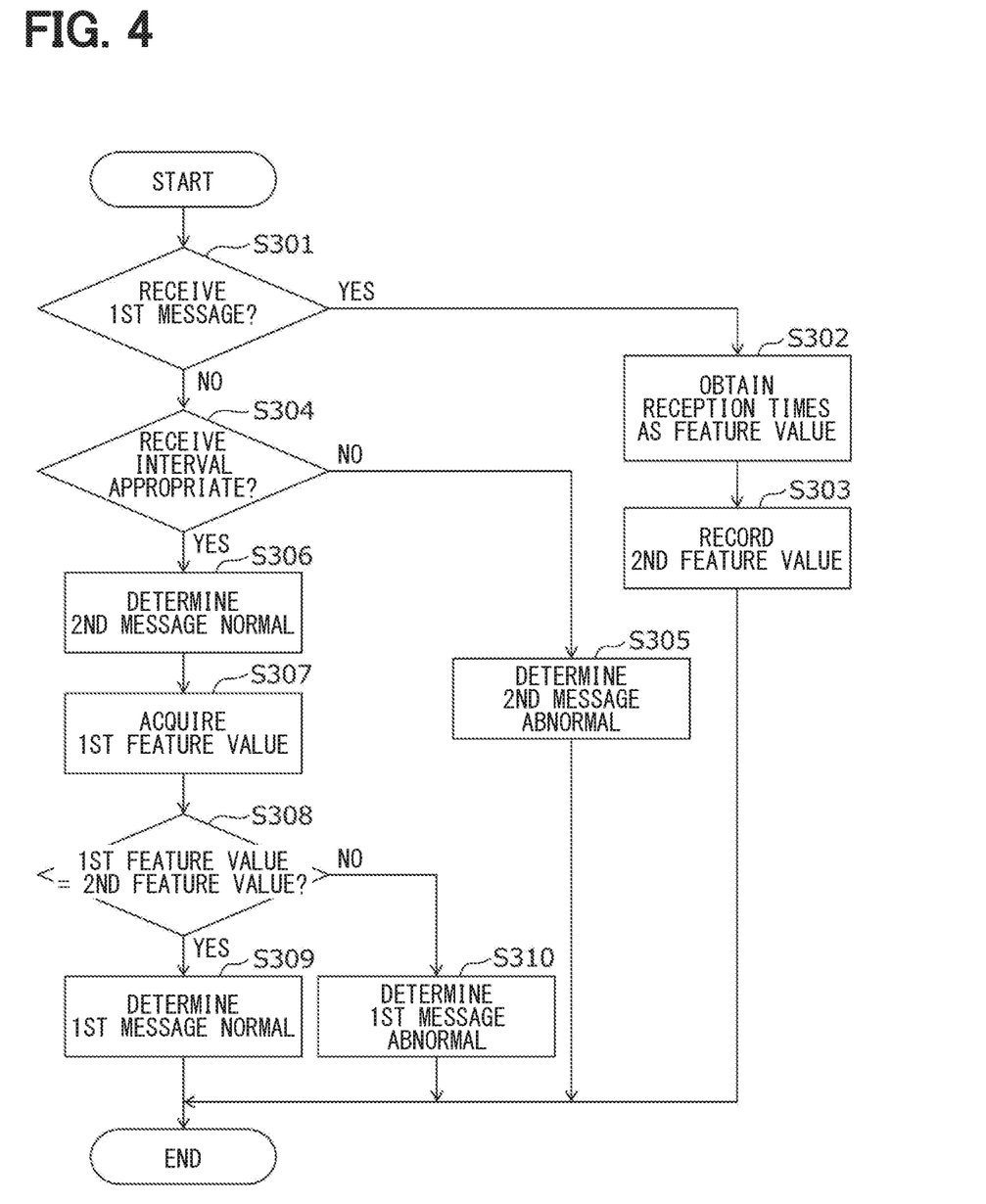
FIG. 4 is a diagram illustrating an operation of a monitoring ECU according to the first embodiment.

FIG. 4 is a diagram showing the operation of the monitoring ECU 200. When the reception unit 201 receives a message, it determines whether the received message is the first message or the second message (S301). If the received message is the first message (S301: Yes), the number of times the first message has been received by the reception unit 201 is obtained or calculated as a second feature value (S302). The second feature value obtained in S302 is recorded in a storage unit (not shown) (S303).

On the other hand, if the received message is not the first message but the second message (S301: No), the elapsed time from the reception of the immediately preceding second message to the reception of the instant second message is equal to the transmission interval of the second message periodically transmitted from the message transmission ECU 100, that is, whether the reception interval is appropriate (S304). If it is determined that the reception interval of the second message is not appropriate (S304: No), the first determination unit 203 determines that the second message received by the reception unit 201 is not normal but abnormal (S305).

In S304, when it is determined that the reception interval of the second message is appropriate (S304: Yes), the first determination unit 203 determines that the second message received by the reception unit 201 is normal (S306). Then, the second determination unit 204 extracts and acquires the first feature value stored in the second message determined to be normal (S307). The second determination unit 204 compares the first feature value acquired in S307 with the second feature value recorded in S303 (S308). Here, when the first feature value (i.e., the number of times the message transmission ECU has transmitted the first message) matches the second feature value (i.e., the number of times that the monitoring ECU 200 has received the first message), it is determined that the first message received by the reception unit 201 is normal (S309). On the other hand, if the first feature value does not match the second feature value, it is determined that the first message is abnormal (S310).

Note that in S304, when the first determination unit 203 determines that the second message is normal based on the number of receptions of the second message per unit time, it may not be possible to identify which of the plurality of second messages received within a unit time is not normal. In this case, in order to prevent erroneous determination in normality of the first message by using the first feature value stored in the abnormal second message, it is determined that there is a possibility that all of the plurality of second messages received within the unit time are abnormal, and the processing after S307 may not be performed.

Figure 5A:
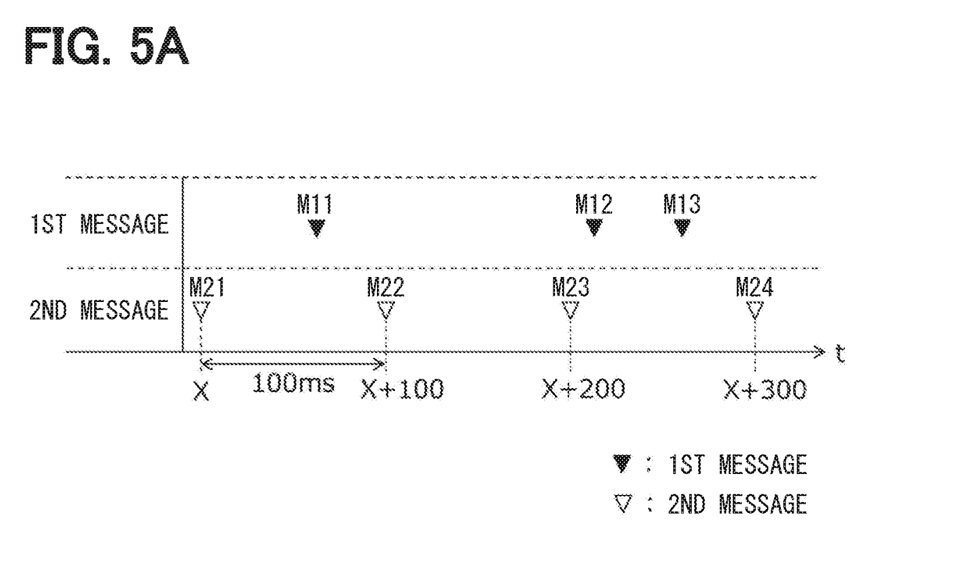
FIG. 5A is a diagram illustrating messages received by the monitoring ECU according to the first embodiment.
Figure 5B:
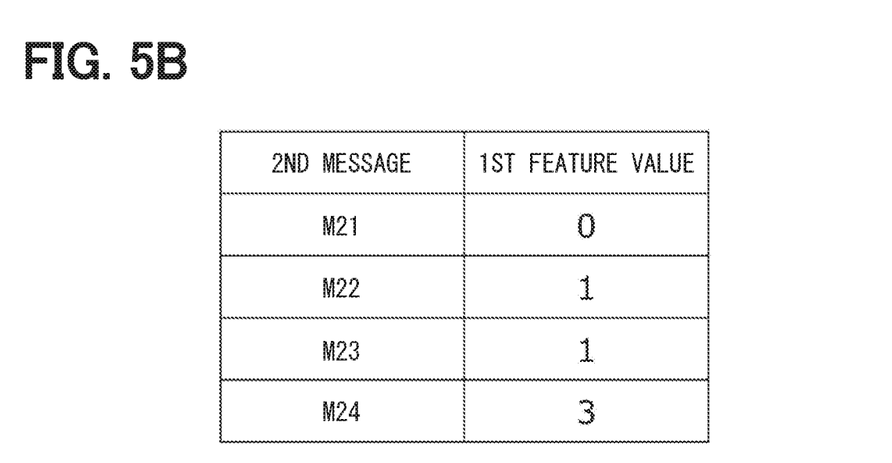
FIG. 5B is a diagram illustrating the messages received by the monitoring ECU according to the first embodiment.

FIGS. 5A and 5B are diagrams illustrating messages received by the monitoring ECU 200. FIG. 5A shows that the reception unit 201 receives the first messages M11 to M13 at irregular intervals and periodically receives the second messages M21 to M24 at reception intervals of 100 ms. In this example, the first message M11 is received between t=X and t=X+100 ms, and the first messages M12 and M13 are received between t=X+200 and t=X+300 ms.

FIG. 5B shows the first feature values acquired or read out from the second messages M21 to M24, respectively. For example, the second determination unit 204 extracts (i.e., reads out) and acquires a first feature value (0) from the second message M21 received at t=X ms. Further, a first feature value (1) is extracted and acquired from the second message M22 received at t=X+100 ms.

For example, when the second message M22 is received at t=X+100 ms, the first determination unit 203 determines whether the second message M22 is normal based on the reception interval between the second messages M21 and M22. In FIG. 5A, since the second message M22 is received at a predetermined reception interval of 100 ms after receiving the second message M21, it can be determined that the second message M22 is normal. Next, the second determination unit 204 acquires the first feature value (1) stored in the second message M22. Here, as shown in FIG. 5A, since the first message that the reception unit 201 has received at t=X+100 ms is only M11, the number of times the reception unit 201 has received the first message is one (i.e., one time). Therefore, the calculation unit 202 obtains a second feature value (1), which is the number of times the first message has been received. Since both the first feature value and the second feature value are (1), it can be determined that the first message received from t=X to t=X+100 ms is normal.

Similarly, for example, when the second message M24 is received at t=X+300 ms, the first determination unit 203 determines whether the second message M24 is normal based on the reception interval between the second messages M23 and M24. In FIG. 5A, since the second message M24 is received at a predetermined reception interval of 100 ms after receiving the second message M23, it can be determined that the second message M24 is normal. Next, the second determination unit 204 acquires or reads out the first feature value (3) stored in the second message M24. Here, as shown in FIG. 5A, at time t=X+300 ms, the reception unit 201 has received the first messages M11, M12, and M13, and the number of times the first message has been received is three. Therefore, the calculation unit 202 obtains a second feature value (3), which is the number of times the first message has been received. Since both the first feature value and the second feature value are (3), it can be determined that the first message(s) received between t=X+200 ms and t=X+300 ms is normal.

Figure 6:
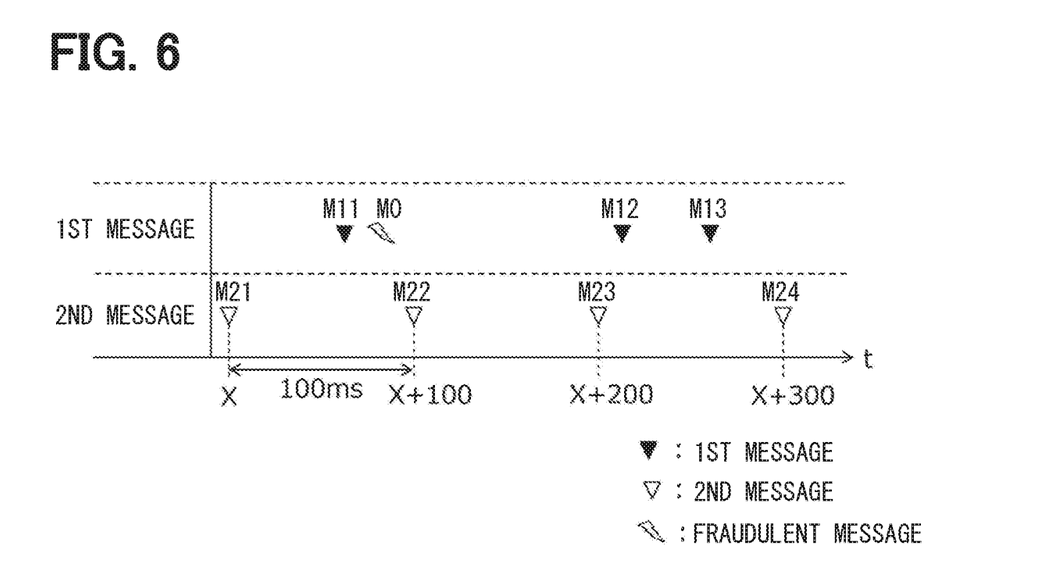
FIG. 6 is a diagram illustrating messages received by the monitoring ECU according to the first embodiment.

FIG. 6 is a diagram illustrating a message received by the monitoring ECU 200, similarly to FIG. 5A. However, unlike FIG. 5A, between t=X ms and t=X+100 ms, the fraudulent message M0 spoofing the first message is received.

As in the case of FIG. 5, when the second message M22 is received at t=X+100 ms, the first feature value (1) stored in the second message M22 is acquired. Next, the calculation unit 202 calculates a second feature value based on the number of times the reception unit 201 has received the first message. Here, in the example of FIG. 6, the reception unit 201 has received, in addition to the first message M11, the fraudulent message M0 spoofing the first message from t=X to t=X+100 ms. Therefore, the calculation unit 202 obtains the second feature value (2) as the number of times the reception unit 201 has received the first message. Since the first feature value (1) stored in the second message M22 is different from the second feature value (2) obtained by the calculation unit 202, the second determination unit 204 determines that one of the first messages M11 and M0 received from t=X ms to t=X+100 ms is a fraudulent message.

Figure 7:
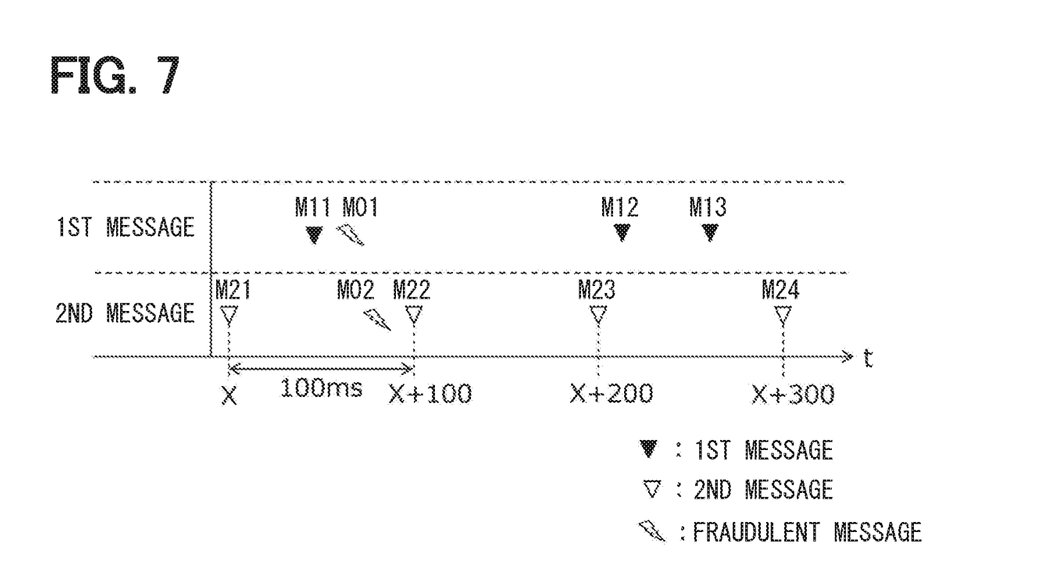
FIG. 7 is a diagram illustrating messages received by the monitoring ECU according to the first embodiment.

In the first embodiment, the first determination unit 203 determines whether the second message is normal. It is however possible to determine a fraudulent message spoofing the first message transmitted and received at irregular intervals even if it is not determined whether the second message is normal. However, as shown in FIG. 7, when fraudulent messages spoofing both the first message and the second message are transmitted and received, it may not be possible to determine the fraudulent message spoofing the first message. Therefore, it is desirable to determine whether the second message is normal.

FIG. 7 is a diagram illustrating a message received by the monitoring ECU 200. As in FIG. 6, the first message M11 and the fraudulent message M01 spoofing the first message are received between t=X ms and t=X+100 ms. Furthermore, in the example of FIG. 7, the fraudulent message M02 spoofing the second message is received.

Suppose a case where in the configuration not determining whether the second message is normal, the fraudulent message M02 is received as a second message. In such a case, the calculation unit 202 obtains the second feature value. In the case of FIG. 7, at the time of receiving the fraudulent message M02, since the reception unit 201 has received the first message M11 and the fraudulent message M01, the calculation unit 202 obtains the second feature value (2). Here, the first feature value (2) is stored in the fraudulent message M02 spoofing the second message; thus, the first feature value and the second feature value are equal. It may be therefore determined that the fraudulent message M01 is a normal message.

On the other hand, in the first embodiment, upon receiving the fraudulent message M02 spoofing the second message, the first determination unit 203 determines whether the fraudulent message M02 is normal based on the reception interval between the second message M21 and the fraudulent message M02 spoofing the second message. It can be thus determined that the fraudulent message M02 is not normal. Therefore, the first feature value stored in the fraudulent message M02 spoofing the first message is not used to determine whether the second message is normal.

As described above, in the present embodiment, it is determined whether the second message transmitted and received periodically is normal or abnormal. Thus, even when fraudulent messages spoofing both the first message and the second message are transmitted and received, it is possible to prevent an improper or fraudulent message spoofing the first message from being erroneously determined to be a normal message.

In the first embodiment described above, an example is described in which one type of first message transmitted and received irregularly is monitored to determine whether the message is normal. However, in the message monitoring system of the present embodiment, it is possible to monitor whether a plurality of types of messages transmitted and received irregularly are normal.

For example, the message transmission ECU 100 further transmits a third message to the monitoring ECU 200. The third message is a message generated when an event different from the event that triggers the generation of the first message occurs. In this case, the second message transmitted and received periodically has a plurality of data areas (for example, a first data area and a second data area). The first data area stores a first feature value representing the feature of the first message, and the second data area stores a third feature value representing the feature of the third message.

The monitoring ECU 200 obtains a fourth feature value representing the feature of the third message received by the reception unit 201 and compares the obtained fourth feature value with the third feature value stored in the second data area of the periodically received second message. Then, it is determined whether the third message is normal based on the comparison result. If the second message has a plurality of data areas and stores a plurality of feature values, S307 to S310 shown in FIG. 4 are repeated for all the data areas.

As described above, according to the present embodiment, it is possible to determine with high accuracy whether a message transmitted and received irregularly is normal.

Second Embodiment

In the first embodiment, an example has been described in which the first message is a message transmitted and received when a predetermined event occurs. In the second embodiment, a case where the first message is a message that is periodically transmitted and received in addition to a case where a predetermined event occurs will be described, focusing on differences from the first embodiment. The configurations of the message transmission ECU 100 and the monitoring ECU 200 of the present embodiment are the same as those in the first embodiment, and will be thus described with reference to FIG. 1.

In the present embodiment, the first message generation unit 101 in the message transmission ECU 100 generates first messages periodically and when a predetermined event occurs, and transmits the respective first messages to the monitoring ECU 200.

Figure 8A:
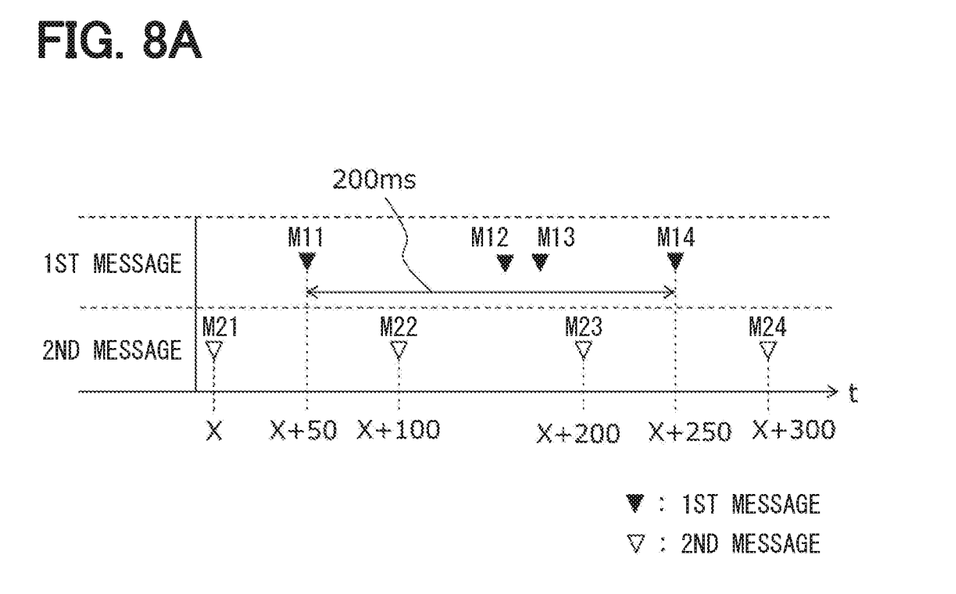
FIG. 8A is a diagram illustrating messages received by a monitoring ECU according to a second embodiment of the present disclosure.

FIGS. 8A and 8B are diagrams illustrating messages received by the monitoring ECU 200. FIG. 8A shows that the reception unit 201 in the monitoring ECU 200 periodically receives the first messages M11 and M14 at reception intervals of 200 ms, and further receives the first messages M12 and M13 transmitted by a predetermined event as a trigger. Further, the reception unit 201 periodically receives the second messages M21 to M24 at reception intervals of 100 ms.

Figure 8B:
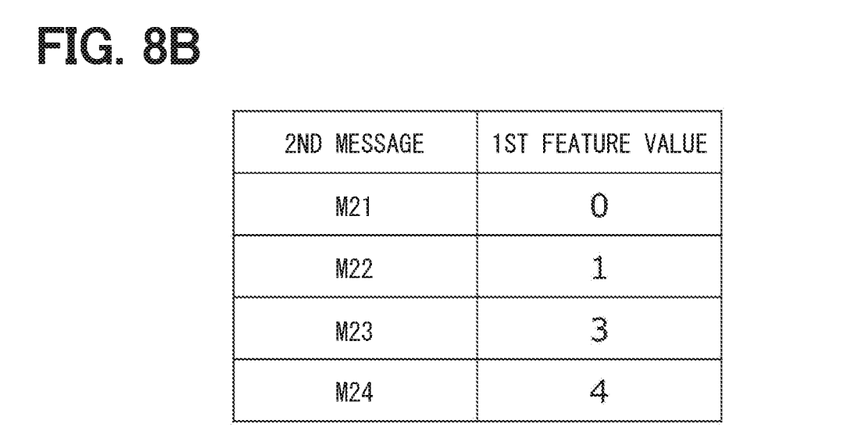
FIG. 8B is a diagram illustrating the messages received by the monitoring ECU according to the second embodiment.

FIG. 8B shows the first feature values acquired from the second messages M21 to M24, respectively. For example, the second determination unit 204 extracts and acquires a first feature value (0) from the first message M21 received at t=X ms. Further, a first feature value (1) is extracted and acquired from the first message M22 received at t=X+100 ms.

In the present embodiment, the second message received by the monitoring ECU 200 stores not only the feature values representing the features of the first messages M12 and M13 transmitted from the message transmission ECU triggered by the occurrence of a predetermined event, but also the feature values representing the features of the first messages M11 and M13 transmitted periodically.

For example, when receiving the second message M23 at t=X+200 ms, the second determination unit 204 acquires the first feature value (3) stored in the second message M23. Here, as shown in FIG. 8A, at time t=X+200 ms, the reception unit 201 has received the first messages M11, M12, and M13, and the number of times the first message has been received the first message is three (i.e., three times). Therefore, the calculation unit 202 obtains a second feature value (3), which is the number of times the first message has been received. Since each of the first feature value and the second feature value is (3), it can be determined that the first messages received between t=X+100 ms and t=X+200 ms are normal.

Figure 9:
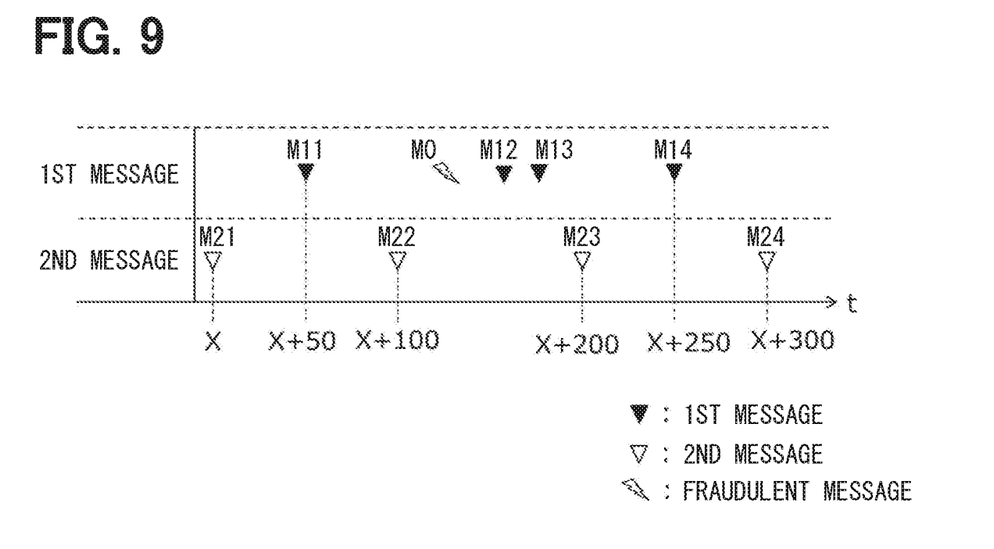
FIG. 9 is a diagram illustrating messages received by the monitoring ECU according to the second embodiment.

In FIG. 9, the first message and the second message are similar to those in FIG. 8A. However, unlike FIG. 8A, the fraudulent message M0 spoofing the first message is further received between t=X+100 ms and t=X+200 ms.

As in the case of FIG. 9, when the second message M23 is received at t=X+200 ms, the first feature value (3) stored in the second message M23 is acquired. Next, the calculation unit 202 calculates a second feature value based on the number of times the reception unit 201 has received the first message. Here, in the example of FIG. 9, the reception unit 201 has received the fraudulent message M0 spoofing the first message in addition to the first messages M11, M12, and M13 from t=X ms to t=X+200 ms. Therefore, the calculation unit 202 obtains the second feature value (4) as the number of times the reception unit 201 has received the first message. The first feature value (3) stored in the second message M23 is different from the second feature value (4) obtained by the calculation unit 202. Thus, the second determination unit 204 determines that any one of the first messages M0, M12, and M13 received between t=X+100 ms and t=X+200 ms is a fraudulent message.

As described above, according to the second embodiment, it is determined whether not only a message transmitted and received irregularly when a predetermined event occurs but also a message transmitted and received periodically are normal.

The second embodiment describes the case where the first messages are transmitted and received periodically and when a predetermined event occurs. Even when the first message is a message that is transmitted and received only periodically, the present disclosure can be applied to determine whether the first message is normal or not. In such a case, the normality of the first message may be determined, in addition to by the above-described method, by determining the first message based on the reception interval of the first message. Fraud can be thus determined more reliably.

Third Embodiment

The above embodiments describe, as shown in FIG. 1, the example in which the monitoring ECU 200 is a gateway device. The present embodiment will describe an example in which an ECU different from a gateway device has a function as the monitoring ECU 200.

Figure 10:
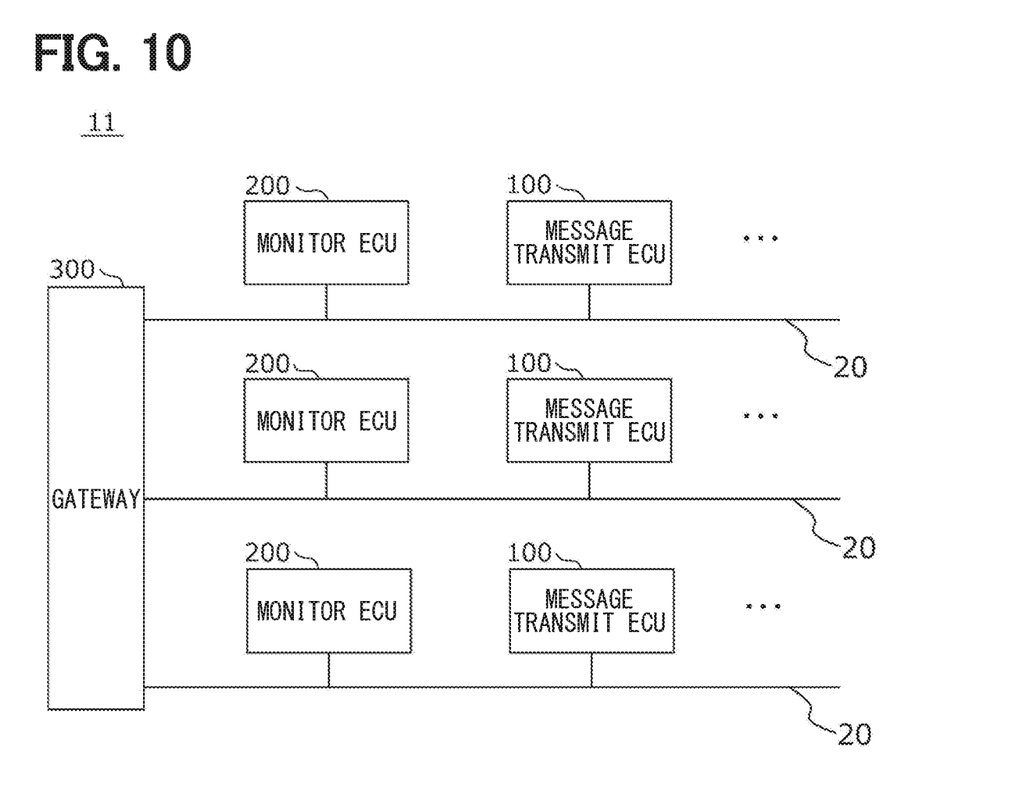
FIG. 10 is a diagram illustrating a message monitoring system according to a third embodiment of the present disclosure.

FIG. 10 shows a message monitoring system 11 according to the present embodiment. The message monitoring system 11 illustrated in FIG. 10 includes a plurality of message transmission ECUs 100 and a plurality of monitoring ECUs 200, and further includes a gateway device 300 connected to a plurality of CAN buses 20. The message transmission ECU 100 and the monitoring ECU 200 are connected to the gateway device 300 via an identical CAN bus 20, The respective configurations of the message transmission ECU 100 and the monitoring ECU 200 of the present embodiment are the same as those of the message transmission ECU 100 and the monitoring ECU 200 shown in FIG. 1.

According to the present embodiment, a monitoring ECU is provided for each CAN bus to determine whether a message is normal or not. Thus, the load on the monitoring ECU can be reduced as compared with a case where all messages are determined whether to be normal or abnormal by a specific ECU such as a gateway device.

Overview

The above embodiments describes (i) the features of the message monitoring system, and (ii) the features of the message transmission ECU and the monitoring ECU, which are included in the message monitoring system.

The terms used in the above embodiments are merely examples, and may be replaced with terms having the same meaning or terms having the same function.

The block diagram used in the description of the embodiments is obtained by classifying and organizing the configuration of the device and the like for each function. Functional blocks are each referred to as a unit, such as the units 101, 102, 103, 104, 201, 202, 203, and 204 in FIG. 1; further, such a unit may also be referred to as a module. An individual one of such functional blocks may be realized by hardware (i.e., hardware circuitry) or any combination of hardware (such as CPU, memory) and software (i.e., program). In addition, since the block diagram shows functions, such a block diagram may be understood as a disclosure of a method and a program product (i.e., a storage medium storing a program product) for realizing the method.

The functional blocks that can be grasped as the processes, flows, and methods described in the embodiments may be rearranged as long as there is no restriction that one step uses the result of another step.

The terms "first" and "second" used in each embodiment are used to distinguish two or more configurations and methods of the same type, and do not limit the order or the priority.

An individual one of the ECUs 100, 200, 300 providing the functions or the units 101, 102, 103, 104, 201, 202, 203, 204 described in the above embodiments may be implemented by one or more special-purpose computers. An individual one of such computers may be created (i) by configuring a memory and a processor programmed to execute one or more particular functions embodied in computer programs, or (ii) by configuring a processor provided by one or more special purpose hardware logic circuits, or (iii) by configuring a combination of (a) a memory and a processor programmed to execute one or more particular functions embodied in computer programs and (b) a processor provided by one or more hardware logic circuits.

Programs are stored in special-purpose or general-purpose hardware storage media (external storage devices (hard disk, USB memory, CD/BD, non-transitory tangible storage media, etc.) and internal storage devices (RAM, ROM, etc.)). Such programs can also be provided to special-purpose or general-purpose hardware via a storage medium or from a server via a communication line without using a storage medium. Consequently, when the program is upgraded, the latest function is always provided.

Industrial Applicability

Although the message monitoring system of the present disclosure has been described as a message monitoring system for a vehicle mainly used in an automobile, it is applicable not only to a vehicle but also to an electronic control unit used for various applications.

For reference to further explain features of the present disclosure, the description is added as follows.

Various types of electronic control units have been mounted on a vehicle. Those electronic control units are connected to each other via a communication network such as a CAN (Controller Area Network) to configure an in-vehicle system. Such an in-vehicle system is known to use a network intrusion detection system (NIDS: Network-based Intrusion Detection System) to detect suspicious accesses or data from an outside.

A monitoring device is known which determines whether a monitoring target message (i.e., a message transmitted and received periodically in a network) is normal. Such a monitoring device determines the monitoring target message is normal based on a comparison between the transmission interval of the monitoring target message transmitted periodically and the reception interval (i.e., reception period or cycle) of the monitoring target message.

The messages transmitted and received between the electronic control units via the communication network include (i) a message periodically transmitted and received at regular intervals and (ii) a message transmitted and received at irregular intervals by being generated by a trigger (i.e., an occurrence of some event). Such a message generated by a trigger as an occurrence of an event is transmitted and received at irregular intervals. Thus, it is not possible to determine whether the message is normal or not based on the reception interval.

It is thus desired to determine whether a message transmitted and received irregularly is normal or not.

Aspects of the present disclosure described herein are set forth in the following clauses.

According to a first aspect of the present disclosure, a message monitoring system for a vehicle may be provided to include a first electronic control unit and a second electronic control unit connected to the first electronic control unit via a communication network.

The first electronic control unit may include a first message generation unit, a first calculation unit, a second message generation unit, and a transmission unit. The first message generation unit may be configured to generate a first message. The first calculation unit may be configured to calculate a first feature value representing a feature of the first message. The second message generation unit may be configured to generate a second message storing the first feature value. The transmission unit may be configured to transmit the first message while periodically transmitting the second message.

The second electronic control unit may include a reception unit, a second calculation unit, and a determination unit. The reception unit may be configured to receive the first message and the second message from the first electronic control unit. The second calculation unit may be configured to calculate a second feature value representing a feature of the first message received by the reception unit. The determination unit may be configured to perform a comparison between (i) the first feature value stored in the second message received by the reception unit and (ii) the second feature value calculated by the second calculation unit, and determine whether the first message is normal based on a result of the comparison.

In the above, the first message generation unit, the first calculation unit, the second message generation unit, and the transmission unit may be implemented by at least one first processor; the reception unit, the second calculation unit, and the determination unit may be implemented by at least one second processor.

According to the above aspect, the determination as to whether the message transmitted and received at irregular intervals is normal or not is enabled.

What is claimed is:

1. A message monitoring system for a vehicle, comprising:
    a first electronic control unit; and
    a second electronic control unit connected to the first electronic control unit via a communication network,
    the first electronic control unit comprising at least one first processor configured to:
        generate a first message in response to an aperiodic occurrence of a predetermined event;
        calculate a first feature value representing a feature of the first message using a first calculation method that generates the first feature value based on the feature of the first message;
        generate a second message storing the first feature value; and
        transmit the first message aperiodically in response to the aperiodic occurrence of the predetermined event while periodically transmitting the second message,
    the second electronic control unit comprising at least one second processor different from the first processor, the second processor being connected to the first processor via the communication network, the second processor being configured to:
        receive the first message transmitted aperiodically and the second message transmitted periodically from the first processor in the first electronic control unit;
        calculate a second feature value representing the feature of the first message received by the reception unit using a second calculation method that generates the second feature value based on the feature of the first message, the second calculation method corresponding to the first calculation method; and
        perform a comparison between (i) the first feature value stored in the second message received by the reception unit and (ii) the second feature value calculated by the second calculation unit, to determine whether the first message is normal based on a result of the comparison;
    wherein:
        the first processor is configured to use the first calculation method to calculate the first feature value based on a number of transmission times the first message has been transmitted; and
        the second processor is configured to use the second calculation method to calculate the second feature value based on a number of reception times the first message has been received.

2. The message monitoring system according to claim 1, wherein
    the second processor is configured to determine whether the second message is normal based on (i) a number of reception times per unit time the second message has been received or (ii) a reception interval at which the second message the second message has been received.

3. The message monitoring system according to claim 1, wherein
    the first processor is configured to generate the first message periodically as well as to generate the first message in response to the aperiodic occurrence of the predetermined event.

4. The message monitoring system according to claim 1, wherein
    the second electronic control unit is configured to be a gateway device connected to a plurality of buses that are included in the communication network.

5. The message monitoring system according to claim 1, further comprising:
    a gateway device connected to a plurality of buses included in the communication network, wherein the first electronic control unit and the second electronic control unit are connected to the gateway device via an identical bus of the plurality of buses.

6. The message monitoring system according to claim 1, wherein the first processor is configured to generate the first message in response to the aperiodic occurrence of the predetermined event, the predetermined event including one of an operation of a brake, an operation of a shift lever, a speed of the vehicle exceeding a predetermined vehicle speed threshold, or a number of engine revolutions exceeding a predetermined engine revolution threshold.

7. The message monitoring system according to claim 6, wherein the feature of the first message corresponds to a data communication parameter of the first message and the first feature value corresponds to one of a message transmission interval of the first message and a message transmission count of the first message.

8. The message monitoring system according to claim 6, wherein:
    the first feature value is calculated to correspond to a number of times the first message has been transmitted; and
    the second feature value is calculated to correspond to a number of times the first message has been received.

9. The message monitoring system according to claim 1, wherein the second processor is configured to determine that the second message is normal in response to the first feature value matching the second feature value and to determine that the second message is at least one of fraudulent and unauthorized in response to the first feature value not matching the second feature value.

10. An electronic control unit comprising at least one first processor connected to a second processor in a monitoring electronic control unit via a communication network, the first processor being configured to:
  generate a first message in response to an aperiodic occurrence of a predetermined event;
  calculate a first feature value representing a feature of the first message using a first calculation method that generates the first feature value based on the feature of the first message;
  generate a second message storing the first feature value; and
  transmit the first message to the second processor in the monitoring electronic control unit aperiodically in response to the aperiodic occurrence of the predetermined event while periodically transmitting the second message to the second processor in the monitoring electronic control unit;
  wherein:
    the second processor is configured to receive the first message and the second message, calculate a second feature value representing the feature of the received first message using a second calculation method that generates the second feature value based on the feature of the first message, perform a comparison between the first feature value stored in the received second message and the second feature value, and determine whether the first message is normal based on a result of the comparison;
    the second calculation method corresponds to the first calculation method;
    the first processor is configured to use the first calculation method to calculate the first feature value based on a number of transmission times the first message has been transmitted; and
    the second processor is configured to use the second calculation method to calculate the second feature value based on a number of reception times the first message has been received.

11. A monitoring electronic control unit comprising at least one second processor connected to at least one first processor in an electronic control unit via a communication network, the second processor being configured to:
  receive a first message transmitted aperiodically and a second message transmitted periodically from the first processor in the electronic control unit, the second message storing a first feature value representing a feature of the first message, and the first feature value having been calculated by the at least one first processor using a first calculation method that generates the first feature value based on the feature of the first message;
  calculate a second feature value representing the feature of the first message received, the second feature value being calculated by the second processor using a second calculation method that generates the second feature value based on the feature of the first message, and the second calculation method corresponding to the first calculation method; and
  perform a comparison between (i) the first feature value stored in the second message received and (ii) the second feature value calculated, to determine whether the first message is normal based on a result of the comparison;
  wherein:
    the first processor is configured to use the first calculation method to perform a logical operation on a value stored in the first message generated to calculate the first feature value; and
    the second processor is further configured to use the second calculation method to calculate the second feature value by performing a logical operation on a value stored in the first message received.

12. A computer-implemented message generation method executed by at least one processor for an electronic control unit connected to a monitoring electronic control unit via a communication network, the method comprising:
  generating a first message in response to an aperiodic occurrence of a predetermined event;
  calculating a first feature value representing a feature of the first message, using a first calculation method that generates the first feature value based on the feature of the first message;
  generating a second message storing the first feature value; and
  transmitting the first message to the monitoring electronic control unit aperiodically in response to the aperiodic occurrence of the predetermined event while periodically transmitting the second message to the monitoring electronic control unit,
  wherein the monitoring electronic control unit is configured to calculate a second feature value representing the feature of the first message using a second calculation method that generates the second feature value based on the feature of the first message, the second calculation method corresponding to the first calculation method, and to perform a comparison between the first feature value and the second feature value to determine whether the first message is normal;
  wherein the first feature value is calculated using the first calculation method based on a number of transmission times the first message has been transmitted; and
  wherein the second feature value is calculated using the second calculation method based on a number of reception times the first message has been received.

13. A non-transitory computer readable storage medium comprising instructions for execution by a computer, the instructions including the message generation method according to claim 12, the method being computer-implemented.

14. A computer-implemented message monitoring method executed by at least one processor in a monitoring electronic control unit connected to an electronic control unit via a communication network, the method comprising:
  receiving a first message transmitted aperiodically and a second message transmitted periodically from the electronic control unit, the second message storing a first feature value representing a feature of the first message, and the first feature value being calculated by the electronic control unit using a first calculation method that generates the first feature value based on the feature of the first message;
  calculating a second feature value representing a feature of the received first message, the second feature value being calculated by the monitoring electronic control unit using a second calculation method that generates the second feature value based on the feature of the first message, and the second calculation method corresponding to the first calculation method;
performing a comparison between the first feature value stored in the received second message and the calculated second feature value; and
determining whether the first message is normal based on a result of the comparison;

wherein:

the first feature value is calculated using the first calculation method by performing a logical operation on a value stored in the transmitted first message; and the second feature value is calculated using the second calculation method by performing a logical operation on a value stored in the received first message.

15. A non-transitory computer readable storage medium comprising instructions for execution by a computer, the instructions including the message monitoring method according to claim 14, the method being computer-implemented.

16. A message monitoring system for a vehicle, comprising:

a first electronic control unit; and
a second electronic control unit connected to the first electronic control unit via a communication network, the first electronic control unit comprising at least one first processor configured to:
generate a first message in response to an aperiodic occurrence of a predetermined event;
calculate a first feature value representing a feature of the first message using a first calculation method that generates the first feature value based on the feature of the first message;
generate a second message storing the first feature value; and
transmit the first message aperiodically in response to the aperiodic occurrence of the predetermined event while periodically transmitting the second message, the second electronic control unit comprising at least one second processor different from the first processor, the second processor being connected to the first processor via the communication network, the second processor being configured to:
receive the first message transmitted aperiodically and the second message transmitted periodically from the first processor in the first electronic control unit;
calculate a second feature value representing the feature of the first message received by the reception unit using a second calculation method that generates the second feature value based on the feature of the first message, the second calculation method corresponding to the first calculation method; and
perform a comparison between (i) the first feature value stored in the second message received by the reception unit and (ii) the second feature value calculated by the second calculation unit, to determine whether the first message is normal based on a result of the comparison;

wherein:

the first processor is configured to use the first calculation method to perform a logical operation on a value stored in the first message generated to calculate the first feature value; and the second processor is configured to use the second calculation method to calculate the second feature value by performing a logical operation on a value stored in the first message received.

17. The message monitoring system according to claim 16, wherein the second processor is configured to determine that the second message is normal in response to the first feature value matching the second feature value and to determine that the second message is at least one of fraudulent and unauthorized in response to the first feature value not matching the second feature value.

* * * * *